(12) United States Patent
Oshima et al.

(10) Patent No.: US 6,587,676 B1
(45) Date of Patent: Jul. 1, 2003

(54) HINGE ASSEMBLY

(75) Inventors: Kazuyoshi Oshima, Naruto-machi (JP); Katsuya Imai, Tako-machi (JP)

(73) Assignee: Sugatsune Kogyo Co., Ltd. (JP)

( * ) Notice: Subject to any disclaimer, the term of this patent is extended or adjusted under 35 U.S.C. 154(b) by 382 days.

(21) Appl. No.: 09/630,893

(22) Filed: Aug. 2, 2000

(30) Foreign Application Priority Data

Aug. 6, 1999 (JP) ............................................. 11-223547

(51) Int. Cl.[7] ................................................. H04B 1/38
(52) U.S. Cl. .................... 455/90; 455/575; 455/550; 16/321; 16/347; 379/433.13
(58) Field of Search ................. 455/550, 575, 455/90; 16/341–343, 337, 321, 347; 361/680, 681; 379/433.13

(56) References Cited

U.S. PATENT DOCUMENTS 5,316,168 A   5/1994   Finch et al. ................. 220/341

FOREIGN PATENT DOCUMENTS

| EP | 0 732 474 A1 | 9/1996 |
|---|---|---|
| EP | 0732474 A1 | 9/1996 |
| EP | 0 772 333 A2 | 5/1997 |
| EP | 0 851 644 A2 | 7/1998 |
| GB | 811591 | 9/1957 |
| GB | 1417617 | 3/1973 |
| GB | 2187228 A | 11/1985 |
| GB | 2300881 A | 5/1996 |
| GB | 2322906 A | 12/1996 |
| JP | 2766074 | 6/1998 |
| JP | 2906346 | 6/1999 |

*Primary Examiner*—Thanh Cong Le
*Assistant Examiner*—Tan Trinh
(74) *Attorney, Agent, or Firm*—Eugene Stephens & Associates

(57) ABSTRACT

A hinge shaft 6 is nonpivotably connected to a cover 3. Two shaft portions 63 are formed on the hinge shaft 6. Spring elements 51, which are nonpivotably disposed at a telephone main body 2, are in pressure contact with the shaft portions 63. By the foregoing arrangement, the shaft portions 63 are functioned as a pivotal movement restricting portion for restricting a pivoting position of the cover 3. The shaft portions 63 are arranged away from each other so that a space S for storing a lubricating oil such as a grease is formed therebetween.

7 Claims, 15 Drawing Sheets

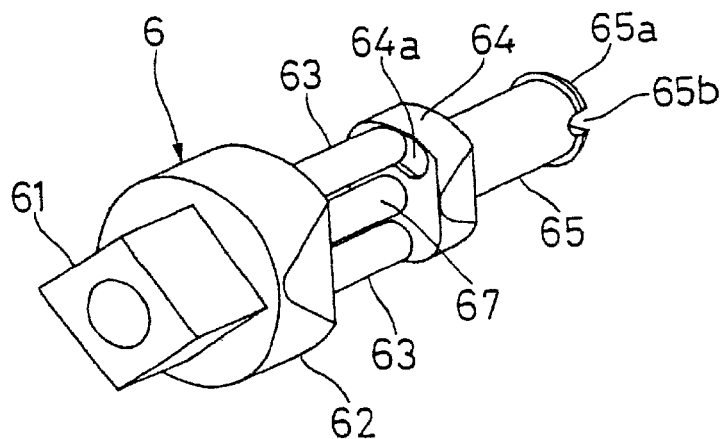
Fig.17A
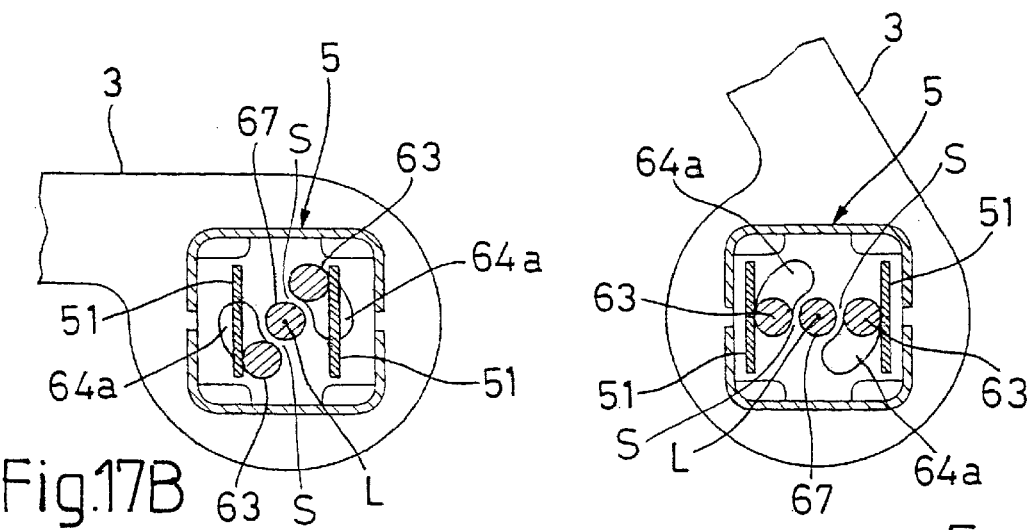
Fig.17B
Fig.17C
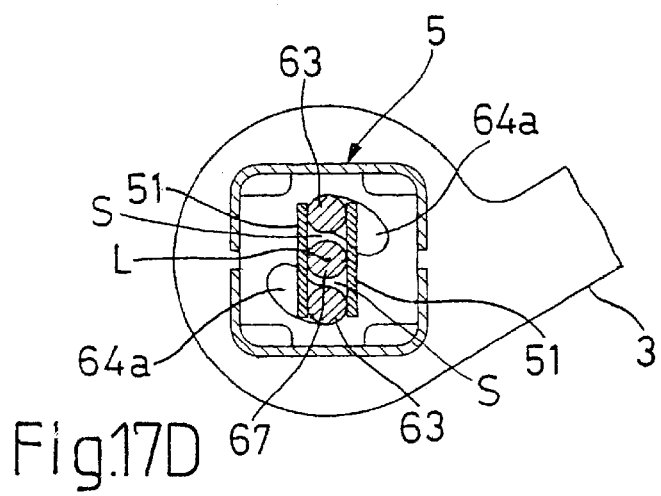
Fig.17D

HINGE ASSEMBLY

BACKGROUND OF THE INVENTION

This invention relates to a hinge assembly for pivotably connecting a device main body and a cover together, such as a telephone main body of a cellular telephone and its cover, a main body of a toilet and its seat, and the like.

Conventional hinge assemblies of this type include a hinge shaft and one pair of plate springs (resilient members). The hinge shaft is pivotably connected to a device main body and nonpivotably connected to an opening and closing cover. On the other hand, the plate spring is nonpivotably mounted on the device main body and pinchingly holds a cam portion (pivotal movement restricting portion) of the hinge shaft between the one pair of plate springs. By this, the hinge shaft is restricted in its pivotal position and thus the cover is restricted in its pivotal position (see Japanese Patent No. 2,766,074 and Japanese Patent No. 2,906, 346).

In the above conventional hinge assemblies, in order to prevent the cam portion of the hinge shaft from being worn out quickly by being rubbed with the resilient members, a lubricant oil such as a grease is applied to an outer peripheral surface of the cam portion. However, the lubricant oil applied to the cam portion is gradually removed by the resilient members. Consequently, oil short occurs thus resulting in fear that the cam portion is worn out quickly.

SUMMARY OF THE INVENTION

According to the present invention, there is provided a hinge assembly having a device main body and an opening and closing member pivotably connected to the device main body, the hinge assembly comprising a hinge shaft disposed on a pivot axis of the opening and closing member, the hinge shaft being pivotably connected to selected one of the device main body and the opening and closing member and nonpivotably connected to the other; and a resilient member nonpivotably connected to the selected one of the device main body and the opening and closing member to which the hinge shaft is pivotably connected; the hinge shaft being formed with a plurality of shaft portions extending generally parallel to the pivot axis, the shaft portions, which are in contact with the resilient member, restricting a pivoting position of the hinge shaft, the plurality of shaft portions being arranged away from one another so that a space is formed between the adjacent shaft portions.

Two or more of the shaft portions may be provided.

In the case where two or more of the shaft portions are provided, an outside diameter of the two shaft portions is preferably small in a mutually opposing direction and large in a direction perpendicular thereto.

It is preferred that the two shaft portions of the hinge shaft are connected to at least that portion of the hinge shaft which is connected to the other (i.e., the device main body or the opening and closing member) such that the two shaft portions are pivotable within a predetermined range about the pivot axis.

It is also preferred that two of the resilient members are provided such that the two resilient members pinchingly hold the two shaft portions from opposite sides thereof.

In the case where three of the shaft portions are provided, they are preferably located at vertices of a triangle.

It is preferred that two of the resilient members are provided such that the two resilient members pinchingly hold at least two shaft portions from the outside of the three shaft portions.

BRIEF DESCRIPTION OF THE DRAWINGS

FIG. 9 is an illustration showing a manufacturing process of a hinge main body.

FIG. 12 is an illustration showing several states when the hinge shaft is inserted into the hinge main body.

FIG. 13 shows several relations between the spring element of the hinge assembly of FIG. 7 and its shaft portion.

FIG. 14 shows several relations between a spring element and a shaft portion according to a second embodiment of the present invention.

FIG. 15 shows several relations between a spring element and a shaft portion according to a third embodiment of the present invention.

FIG. 16 shows several relations between a spring element and a shaft portion according to a fourth embodiment of the present invention.

FIG. 17 shows a fifth embodiment of the present invention, FIG. 17(A) is a perspective view of a hinge shaft, FIGS. 17(B), 17(C) and 17(D) are views similar to FIGS. 13(A), 13(B) and 13(C), respectively; and FIG. 18 shows several relations between a spring element and a shaft portion according to a sixth embodiment of the present invention.

DETAILED DESCRIPTION OF THE EMBODIMENTS

Several embodiments of the present invention will now be described with reference to FIGS. 1 to 18.

Figure 1:
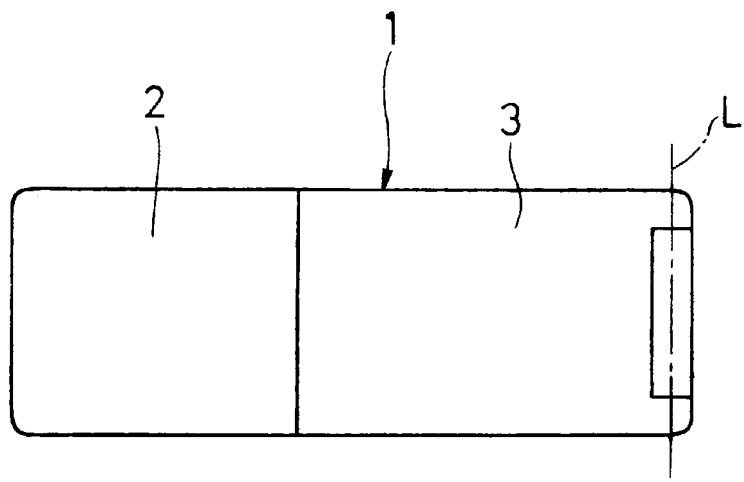
FIG. 1 is a plan view showing a cellular telephone incorporated with a hinge assembly according to the present invention.
Figure 2:
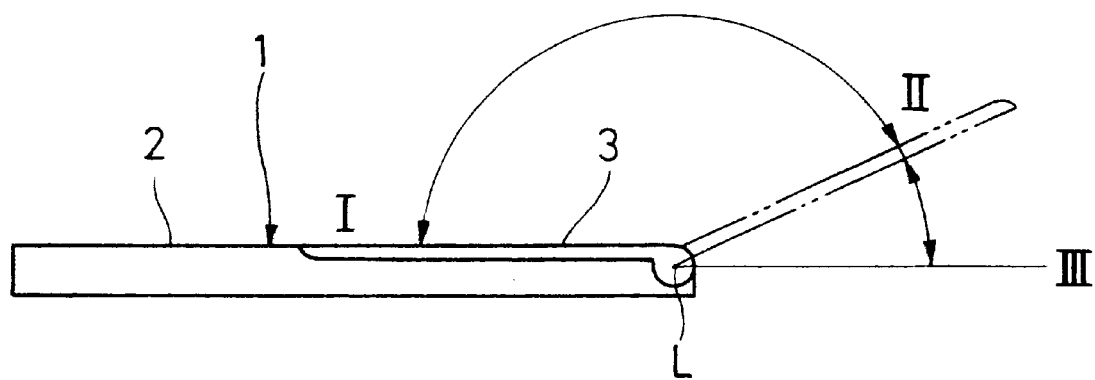
FIG. 2 is a front view of the cellular telephone.

Firstly, a first embodiment of the present invention is described with reference to FIGS. 1 to 13. In this embodiment, a hinge assembly 4 according to the present invention is applied to a cellular telephone 1. The construction of the cellular telephone 1 and the hinge assembly 4 is described briefly. As shown in FIGS. 1 and 2, the cellular telephone 1 includes a telephone main body (device main body) 2 and a cover (opening and closing member) 3. The telephone main body 2 has one pair of hinge assemblies 4, 4 of FIG. 7 disposed at opposite sides of a basal end portion (right end portion of FIGS. 1 and 2) thereof. Through the one pair of hinge assemblies 4, 4, one end portion of the cover 3 is pivotably connected to the basal end portion of the telephone main body 2 about a pivot axis L.

As shown in FIGS. 3 to 6, an attachment portion 21 extending on the pivot axis L is formed on the basal end portion of the telephone main body 2. Attachment holes 21a, 21a each having a square configuration in section are formed in opposite end faces of the attachment portion 21. Connecting protrusions 31, 31 are formed on opposite sides of the one end portion of the cover 3. The respective connecting portions 31, 31 are arranged in such a manner as to face the opposite end faces of the attachment portion 21. An engagement hole 31a having a square configuration in section is formed in that surface of each connecting protrusion 31 which faces the attachment portion 21.

Figure 3:
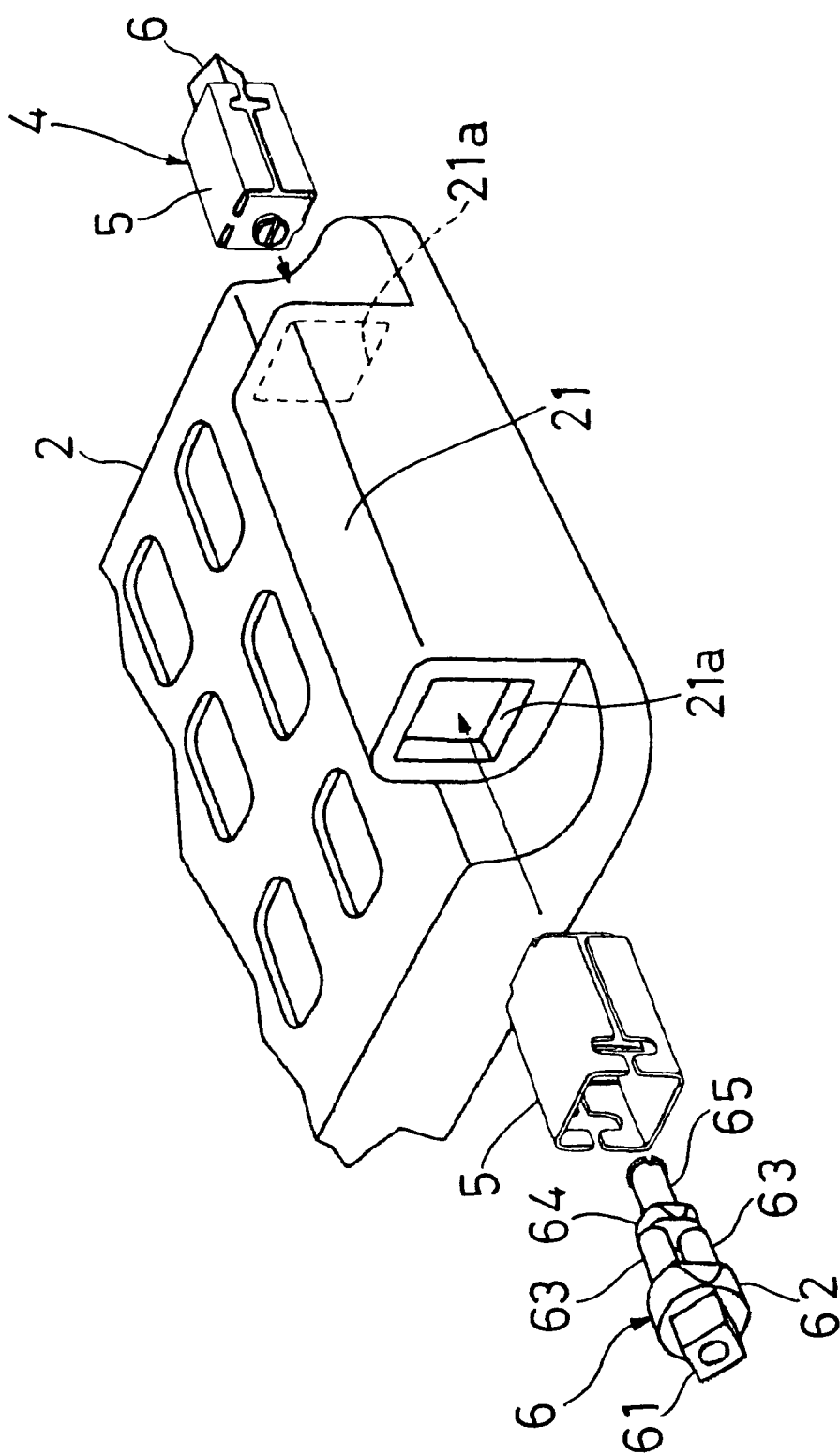
FIG. 3 is an exploded perspective view, showing one end of a telephone main body to which a cover is attached, and the hinge assembly.
Figure 4:
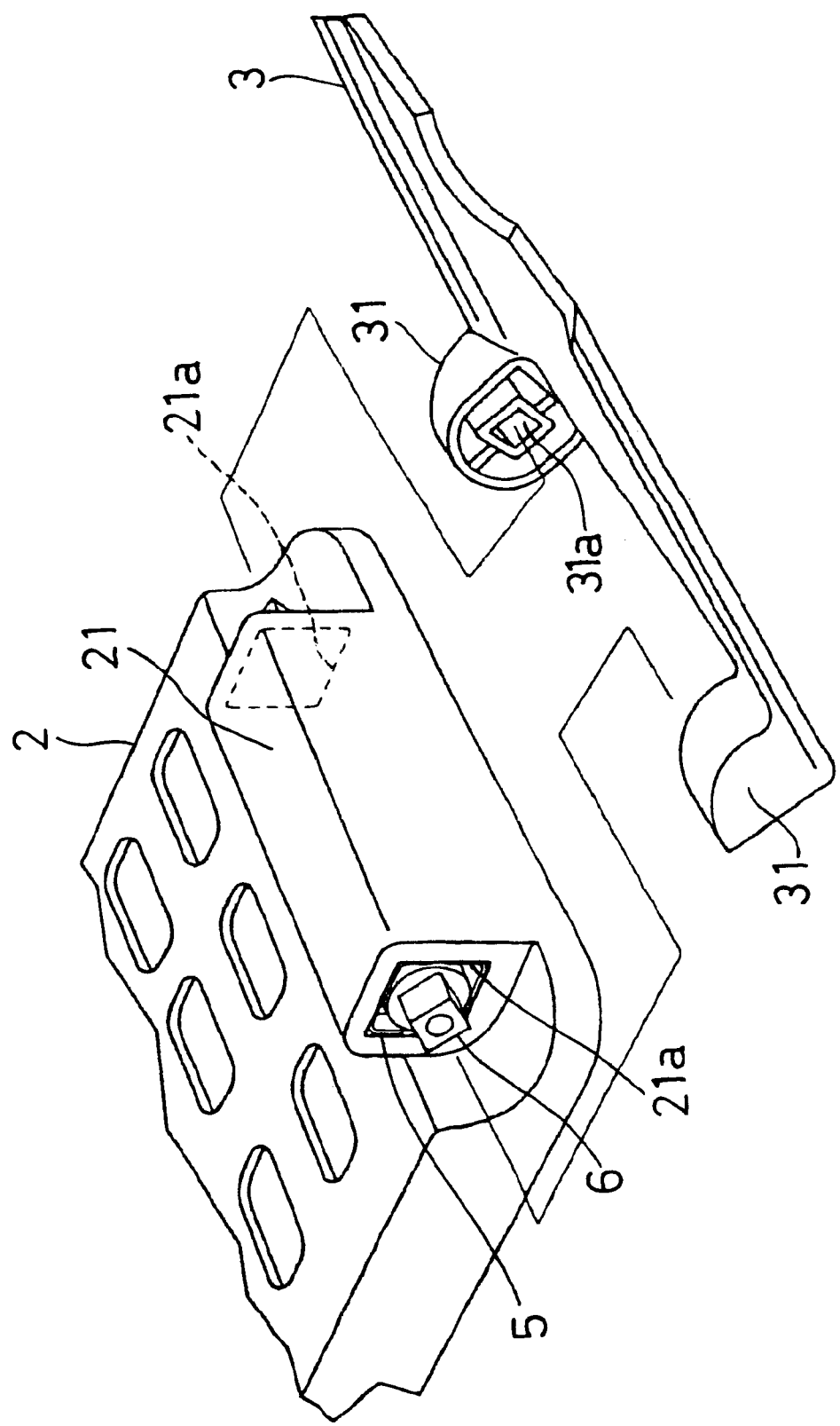
FIG. 4 is an exploded perspective view showing the telephone main body and the cover.
Figure 5:
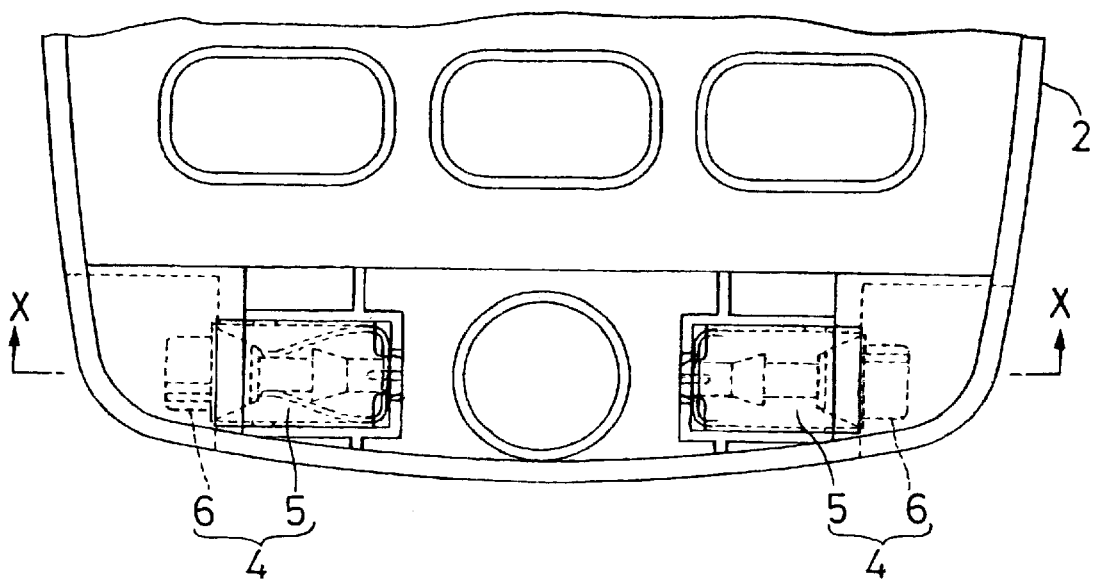
FIG. 5 is an enlarged view, when viewed from a rear side, of the end portion of the telephone main body to which the cover is attached.
Figure 7:
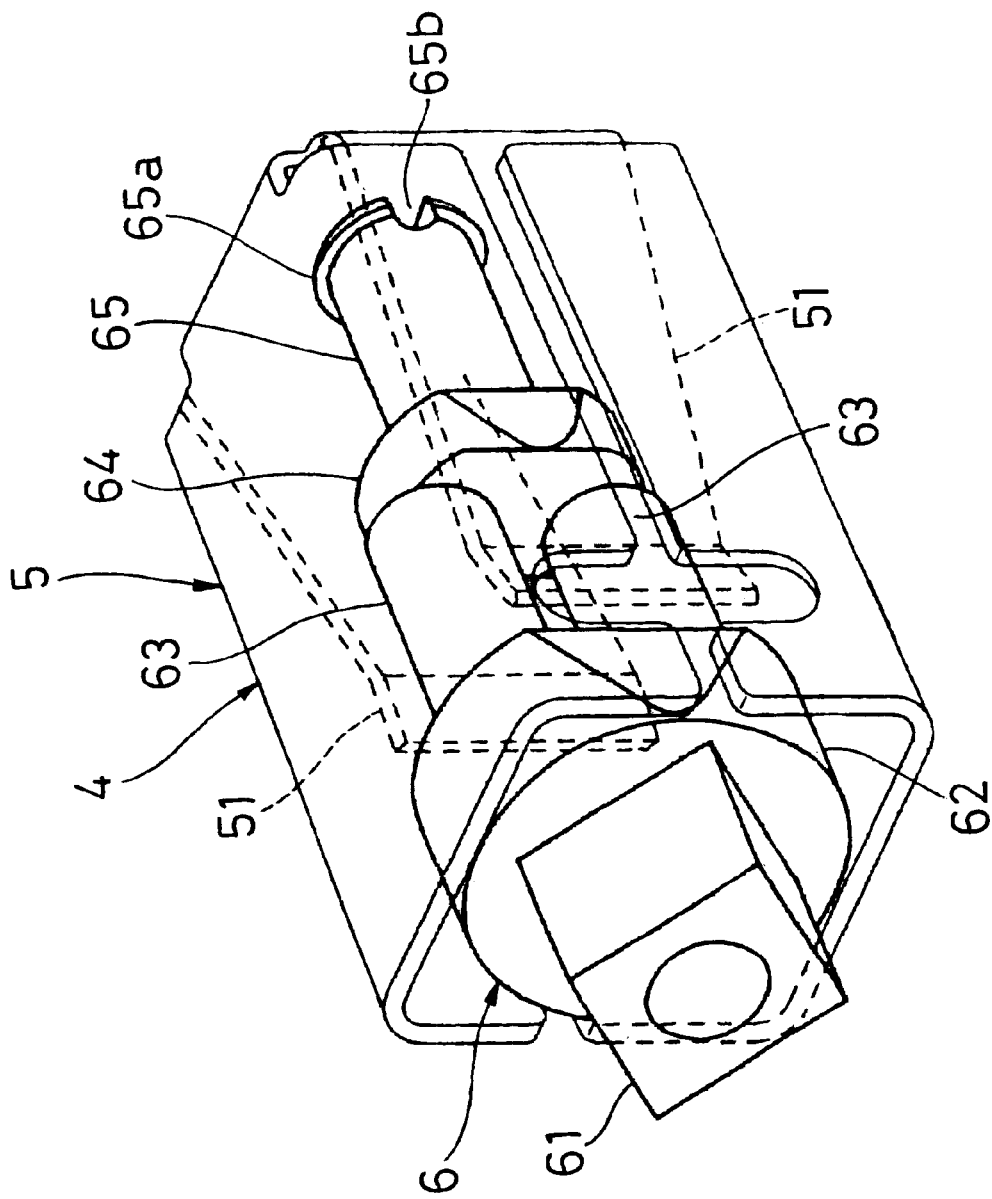
FIG. 7 is a sight through perspective view showing one embodiment the hinge assembly according to the present invention.
Figure 8A:
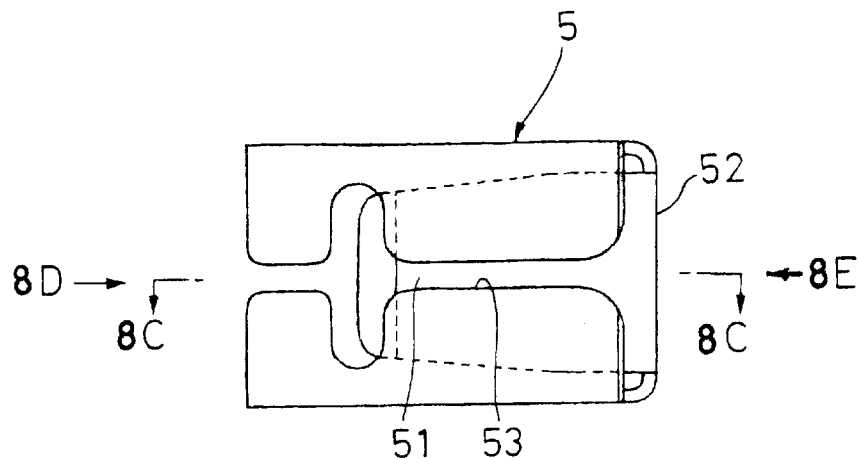
FIG. 8(A) is a front view thereof.
Figure 8B:
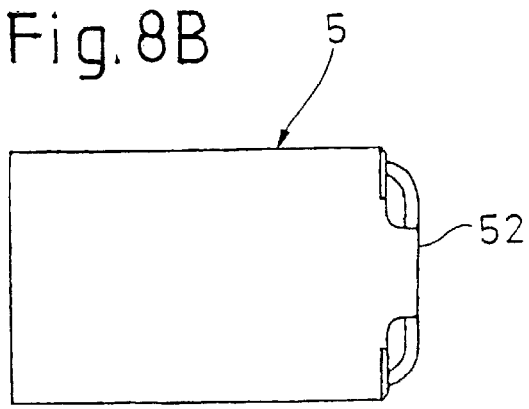
FIG. 8(B) is a plan view thereof.
Figure 8D:
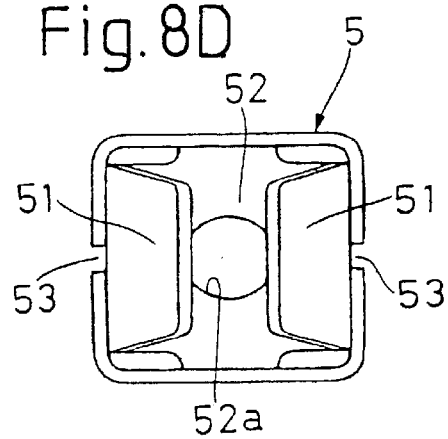
FIG. 8 is an illustration showing a hinge main body.
FIG. 8(C) is a sectional view taken on line C—C of FIG. 8(A), and FIGS. 8(D) and 8(E) are views when viewed in directions as indicated by arrows D and E of FIG. 8(A), respectively.
Figure 8C:
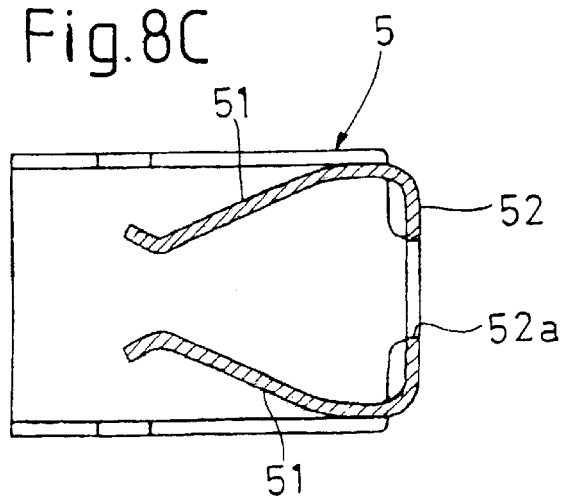
Figure 8E:
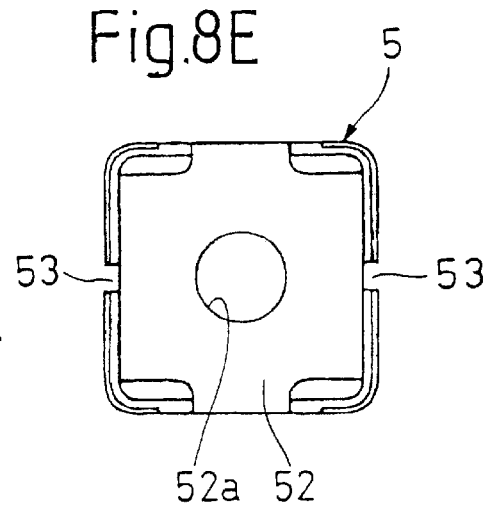

The hinge assembly 4, as shown in FIG. 7, includes a hinge main body 5 and a hinge shaft 6. As shown in FIGS. 3 and 4, the hinge main body 5 is nonpivotably engaged with the attachment hole 21a of the telephone main body 2. The hinge shaft 6 is arranged such that its axis is in alignment with the pivot axis L. One end portion of the hinge shaft 6 is pivotably supported by the telephone main body 2 through the hinge main body 5. The other end portion of the hinge shaft 6 projects outside from the telephone main body 2 and is nonpivotably inserted into the engagement hole 31a of the cover 3. As a consequence, the cover 3 is pivotably connected to the telephone main body 2 through the hinge assembly 4.

If the hinge shaft 6 is pivotably connected to the telephone main body 2 as shown in the instant embodiment of FIGS. 1 to 13, the hinge shaft 6 is nonpivotably connected to the cover 3 and the hinge main body 5 is nonpivotably connected to the telephone main body 2. However, in the alternative, if the hinge shaft 6 were to be pivotably connected to the cover 3, the hinge shaft 6 would be nonpivotably connected to the telephone main body 2 and the hinge main body 5 would be nonpivotably connected to the cover 3. In other words, it is possible to reverse the way the hinge assembly 4 is disposed between the telephone main body 2 and the cover 3.

Figure 6:
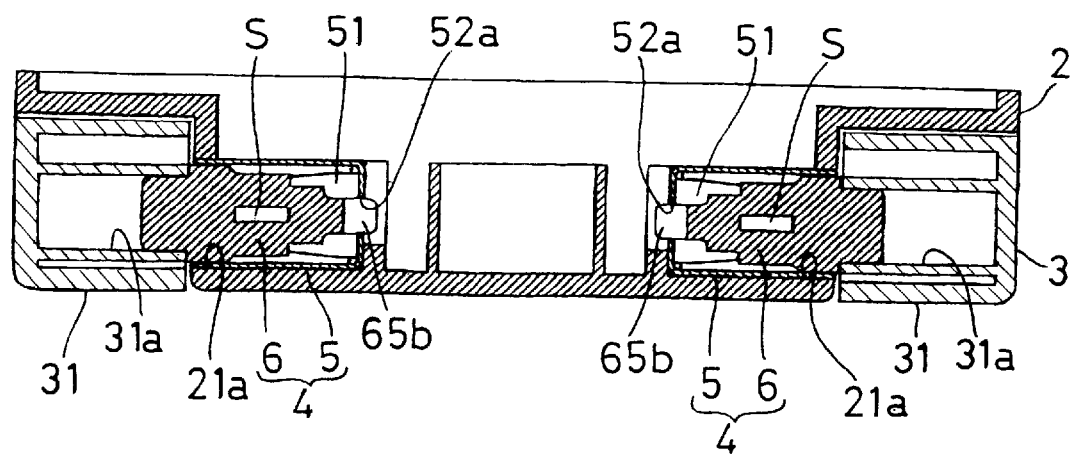
FIG. 6 is a sectional view taken on line X—X of FIG. 5.
Figure 9A:
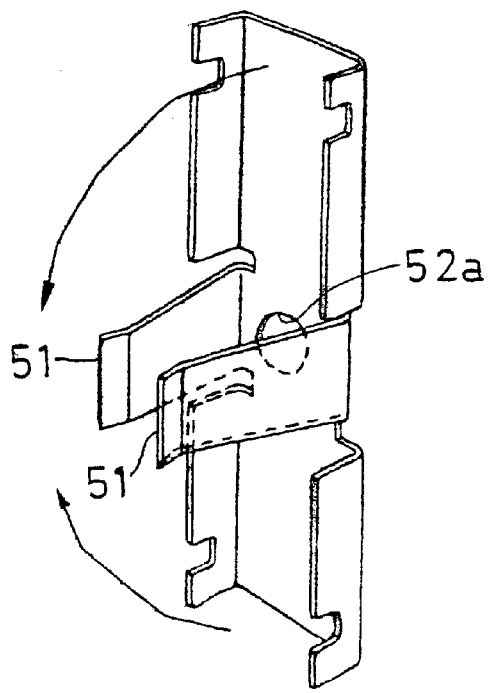
FIG. 9(A) is a perspective view showing an intermediate stage of a process for bending the hinge main body.
Figure 9B:
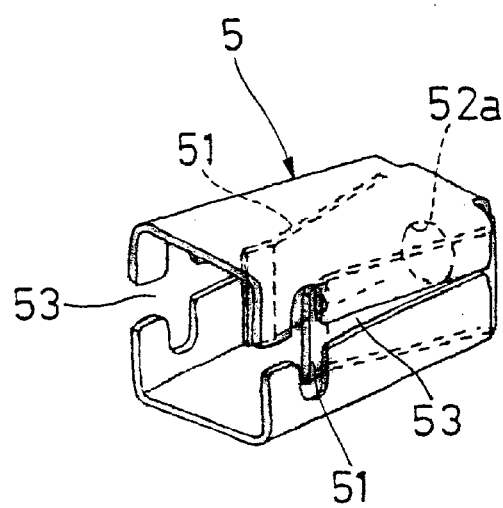
FIG. 9(B) is a perspective view showing the hinge main body after the completion of the bending process.

The hinge main body 5 of the hinge assembly 4 and its hinge shaft 6 will now be described in more detail. The hinge main body 5 is composed by bend machining a metal plate. The hinge main body 5, as shown in FIGS. 7 to 9, is formed in a sleeve-like configuration having a generally square configuration in section, in which one end thereof is open and the other end is closed by a bottom portion 52. As shown in FIG. 9(B), the hinge main body 5 has two pairs of opening side walls. The dimension between one pair of opposing side walls (first opposing side walls) is larger on the opening portion side than the width of the attachment hole 21a. Moreover, slits 53, 53 are formed in one pair of the remaining opposing side walls (second opposing side walls). Thereby, the dimension between the first opposing side walls can be enlarged and reduced in diameter resiliently. The hinge main body 5, when attached to the attachment hole 21a, is resiliently deformed and reduced and is in pressure contact with an inner surface of the attachment hole 21a. By this, play can be prevented from occurring between the hinge main body 5 and the telephone main body 2. The hinge main body 5 can entirely be inserted in the attachment hole 21a. As shown in FIGS. 4 and 6, the end face of the hinge main body 5 on the opening side is generally coplanar with an end face of the attachment portion 21.

One pair of spring elements 51, 51 (resilient members) are formed within the hinge main body 5. The one pair of spring elements 51, 51 extend towards the opening portion side from the bottom portion 52. Since the hinge main body 5 is nonpivotably attached to the telephone main body 2, the spring elements 51, 51 are nonpivotable with respect to the telephone main body 2. The spring elements 51, 51 may be separately formed and they may be provided directly on the telephone main body 2. A support hole 52a is formed in a central portion of the bottom portion 52 of the hinge main body 5 in such a manner as to be coaxial with the pivot axis L.

Figure 10:
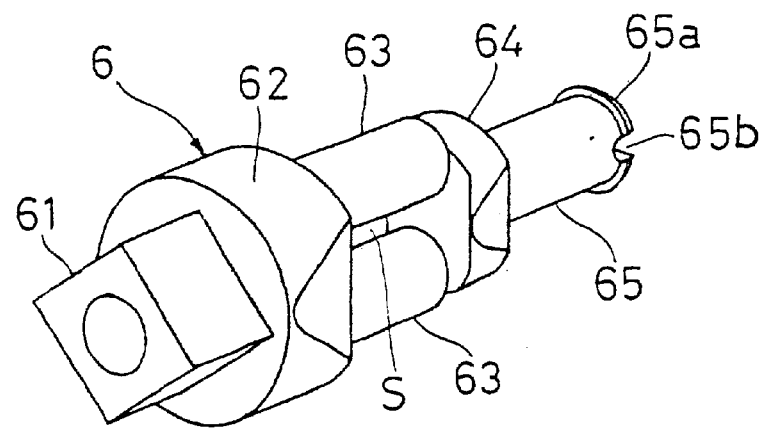
FIG. 10 is a perspective view showing a hinge shaft of the hinge assembly of FIG. 7.
Figure 11A:
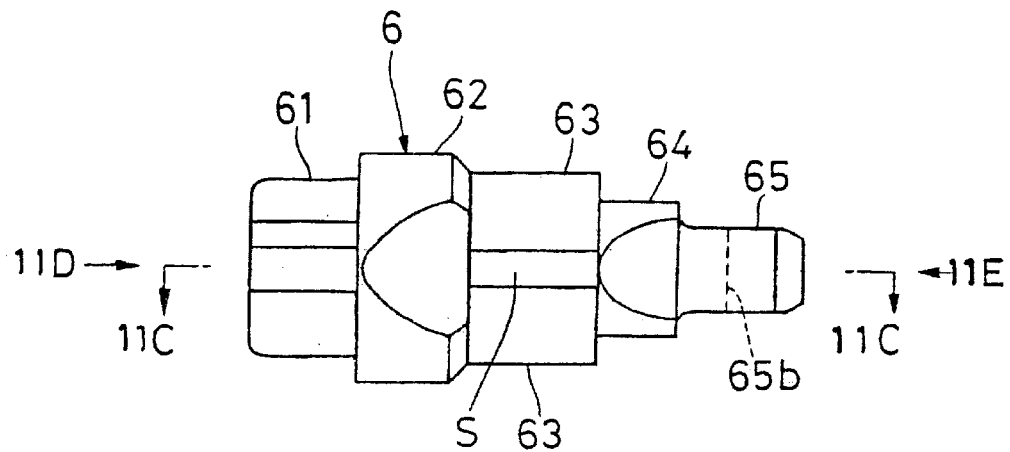
FIG. 11(A) is a front view thereof.
Figure 11B:
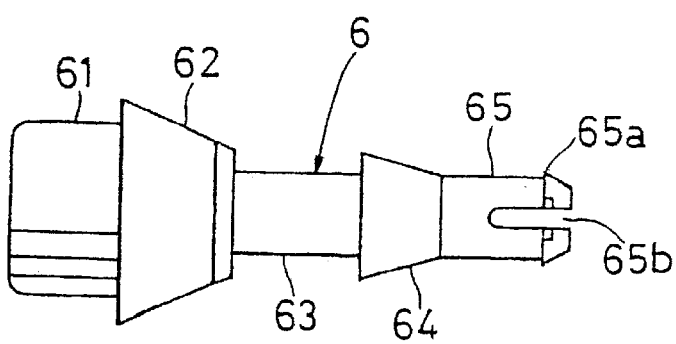
FIG. 11(B) is a plan view thereof.
Figure 11D:
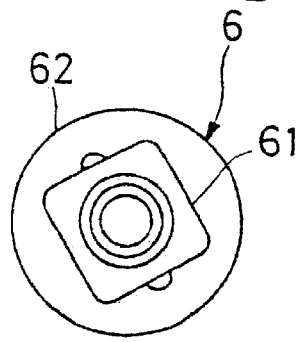
FIG. 11 is an illustration showing the hinge shaft.
FIG. 11(C) is a sectional view taken on line C—C of FIG. 11(A) and FIGS. 11(D) and 11(E) are views when viewed in the directions as indicated by arrows D and E of FIG. 11(A), respectively.
Figure 11C:
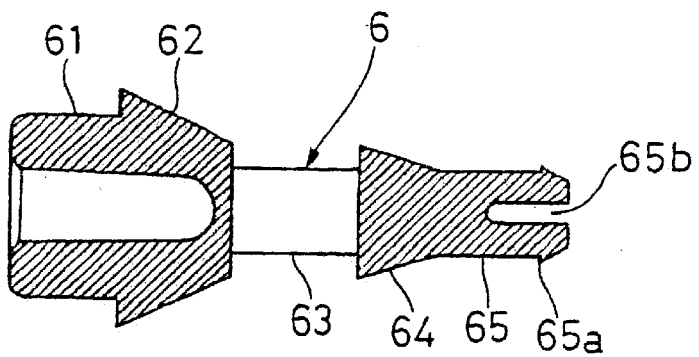
Figure 11E:
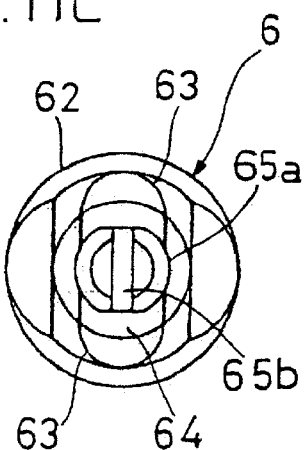

The hinge shaft 6 is molded from resin. As shown in FIGS. 7, 10 and 11, the hinge shaft 6 has an engagement portion 61 of a square configuration in section, a substrate portion 62 of a circular configuration in section, two mutually parallel shaft portions 63, 63 each of a circular configuration in section, a reinforcement plate portion 64 of an elliptical configuration in section, and a connecting shaft portion 65 of a circular configuration in section, which are all formed in order from one end side to the other end side. The engagement portion 61, the substrate portion 62, the reinforcement portion 64 and the connecting shaft portion 65 are formed in such a manner as to be coaxial with the pivot axis L. An annular projection 65a is formed on a distal end portion of the connecting shaft portion 65. A slit 65b is also formed in the distal end portion of the connecting shaft portion 65. This slit 65b extends towards a basal end side of the connecting shaft portion 65 from its central portion of the distal end face. Owing to a provision of this slit 65b, the distal end portion of the connecting shaft portion 65 and the annular projection 65a can be enlarged and reduced in diameter.

The shaft portions 63, 63 correspond to the cam portions (pivotal movement restricting portions) of the conventional hinge shaft. They are arranged in such a manner as to be parallel to the pivot axis L and spaced away with the pivot axis L disposed therebetween. Moreover, the shaft portions 63, 63 are arranged at a space of 180 degrees in the circumferential direction about the pivot axis L. A space S is formed between the two shaft portions 63, 63. This space S extends along the shaft portion 63. Opposite end portions of the space S in a direction of the pivot axis L are closed by the substrate portion 62 and the reinforcement plate portion 64. Accordingly, when a lubricating oil such as a grease (not shown) is received in the space S, the lubricating oil tends to leak outside only from between the shaft portions 63, 63 and not from other regions.

Figure 12A:
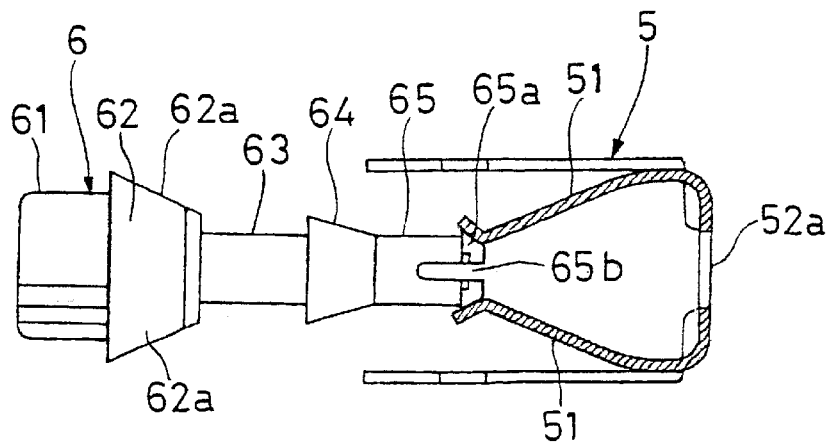
FIG. 12(A) shows a state in which a distal end portion of the hinge shaft is in abutment with a spring element.

The hinge shaft 6 thus constructed is inserted into the hinge main body 5 from its opening portion in the following manner. That is, the hinge shaft 6, as shown in FIG. 12, is held in such a posture that the opposing directions of the two shaft portions 63, 63 are orthogonal to the opposing directions of the one pair of spring elements 51, 51. The hinge shaft 6 is inserted into the hinge main body 5 first with its connecting shaft portion 65 side. When the hinge shaft 6 is inserted into the hinge main body 5, the annular projection 65a hits the distal end portions of the spring elements 51, 51 as shown in FIG. 12(A). Since the annular projection 65a and the distal end portions of the spring elements 51, 51 are tapered, the annular projection 65a can easily pass between the distal end portions of the spring elements 51, 51. This is also applicable to the reinforcement plate portion 64.

Figure 12B:
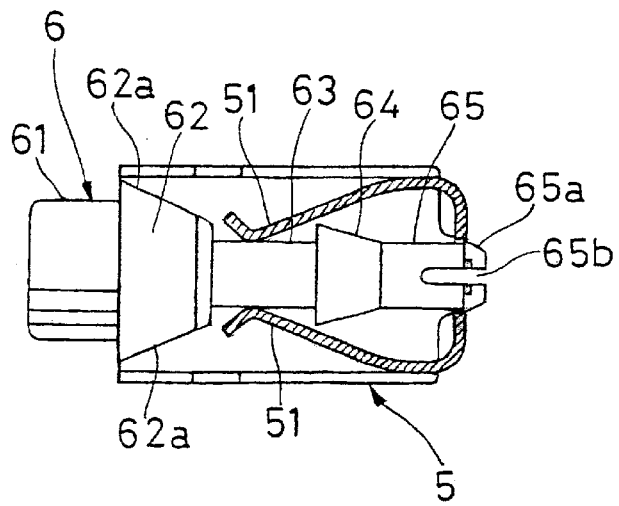
FIG. 12(B) shows a state in which the distal end portion of the hinge shaft is in engagement with a support hole formed in the hinge main body and FIG. 12(C) shows a state in which the hinge shaft is inserted further into the hinge main body.

When the hinge shaft 6 is inserted into the hinge main body 5 until the basal ends side of the shaft portions 63, 63 come to contact with the spring elements 51, 51, the annular projection 65a hits an inner peripheral surface of the support hole 52a and is reduced in diameter, thereby it is allowed to pass through the support hole 52a. Then, as shown in FIG. 12(B), the distal end portion of the connecting shaft portion 65 is pivotably engaged with the support hole 52a of the bottom portions 52 of the hinge main body 5. Moreover, the substrate portion 62 of the hinge main body 5 is generally in contact with the inner peripheral surface of the hinge main body 5. By this, the hinge shaft 6 is pivotably supported by the hinge main body 5 about the pivot axis L and thus pivotably supported by the telephone main body 2. Since the annular projection 65a is enlarged in diameter after passing through the support hole 52a, it is engaged with the bottom portion 52, thereby the hinge shaft 6 is prevented from escaping from the opening portion side of the hinge main body 5.

Figure 12C:
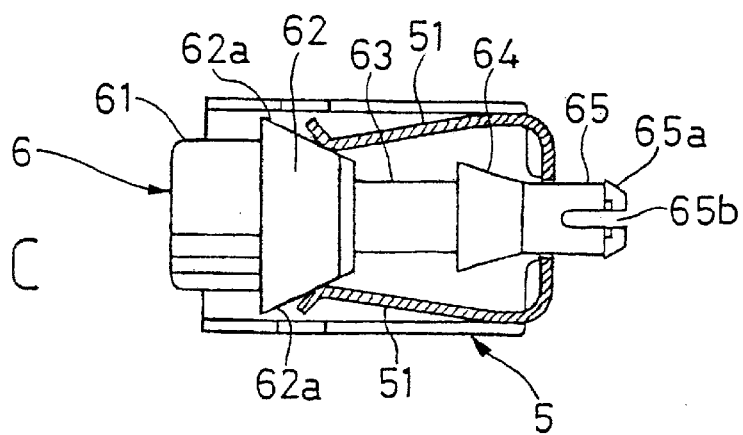

As shown in FIGS. 4 and 12(B), the engagement portion 61 of the hinge shaft 6 projects outside from the opening portion of the hinge main body 5. In the case where the engagement portion 61 is engaged with the engagement hole 31a of the cover 3, the hinge shaft 6 is further moved towards the bottom portion 52 side of the hinge main body 5. Then, the distal end portions of the spring elements 51, 51 hit the substrate portion 62, and as shown in FIG. 12(C), climb over the tapered surfaces 62a, 62a of the substrate portion 62. By this, the hinge shaft 6 is allowed to move further towards the bottom portion 52 side. After the hinge shafts 6, 6 of the two hinge assemblies 4, 4 are moved such that the engagement portion 61 is entirely inserted into the hinge main body 5, the attachment portion 21 of the telephone main body 2 is inserted into between the connecting protrusions 31, 31 of the cover 3. When the engagement portions 61, 61 of the hinge shafts 6, 6 are faced with the engagement holes 31a, 31a of the connecting protrusions 31, 31, the hinge shafts 6, 6 are pushed back by the biasing force of the spring elements 51, 51 and the engagement portions 61, 61 are engaged with the connecting holes 31a, 31a. Thereby, the hinge shafts 6, 6 are nonpivotably connected to the cover 3 and the cover 3 is pivotably connected to the telephone main body 2 through the hinge shaft 6 and the hinge main body 5.

Figure 13A:
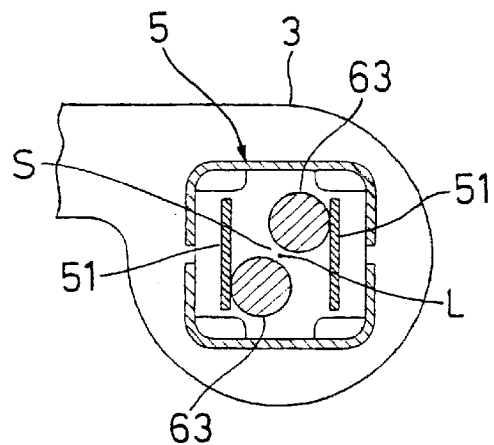
FIG. 13(A) shows a relation when the cover is pivoted to a closed position.

FIG. 13 shows a relation between the two shaft portions 63, 63 and the spring elements 51, 51 when the cover 3 is pivoted to the respective positions. As shown in FIG. 13(A), when the cover 2 is pivoted to the closed position as indicated by I of FIG. 2, the spring elements 51, 51 are in contact with the shaft portions 63, 63, respectively and bias the shaft portions 63, 63 in a counterclockwise direction of FIG. 13. Accordingly, the cover 3 is biased in a direction towards the closed position I side from the open position II side and hits the telephone main body 2. Thereby, the cover 3 is held in the closed position I.

Figure 13B:
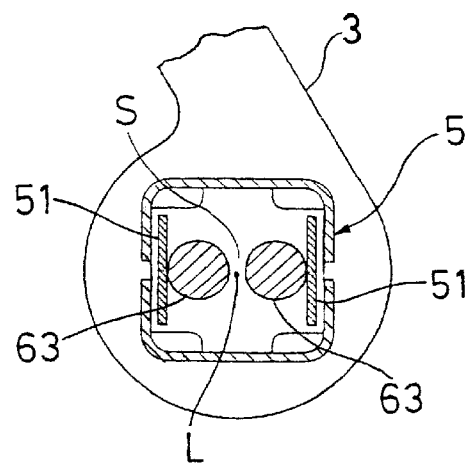
FIG. 13(B) shows a relation when the cover is pivoted to a neutral position and FIG. 13(C) shows a relation when the cover is pivoted to an open position.

When the cover 3 in the closed position I is pivoted about 60 degrees towards the open position II side against the biasing force of the spring elements 51, 51, as shown in FIG. 13(B), the biasing force of the spring elements 51, 51 with respect to the shaft portions 63, 63 acts on a line which is orthogonal to the pivot axis L (the pivoting position of the cover 3 at that time is hereinafter referred to as the "neutral position"). Accordingly, when the cover 3 is pivoted to the neutral position, the cover 3 is held in the neutral position by frictional resistance acting between the spring element 51 and the shaft portion 63 and without receiving the pivotal biasing force of the spring element 51. When the cover 3 is pivoted, even if slightly, from the neutral position towards the closed position I side, it is biased towards the closed position I side by the spring element 51, and when the cover 3 is pivoted towards the open position II side, it is biased towards the open position II side. The neutral position may be set to any other position than the position 60 degrees away from the closed position I.

Figure 13C:
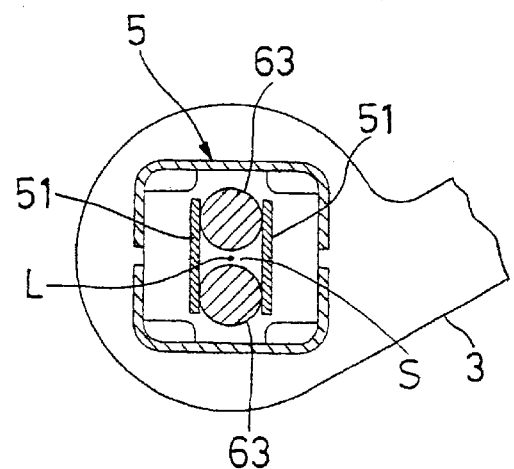

When the cover 3 is pivoted about 150 degrees from the closed position I, it reaches to the open position II. In the open position II, as shown in FIG. 13(C), one of the two spring elements 51, 51 is simultaneously pressure contacted with the two shaft portions 63, 63 from one side and the other spring element 51 is simultaneously pressure contacted with the two shaft portions 63, 63 from the other side. That is to say, the spring elements 51, 51 simultaneously pinchingly hold the two shaft portions 63, 63. As a consequence, the cover 3 is maintained in the open position II stably. The cover 3 can be further pivoted a predetermined angle (about 180 degrees from the closed position I) (this ultimate position is hereinafter referred to as the "fully open position III") in the opening direction from the open position II. The cover 3, which is currently located in-between the open position II and the fully open position III, is returned to the open position II by the biasing force of the spring elements 51, 51.

In the hinge assembly 4 having the above-mentioned construction, although the shaft portions 63, 63 are rubbed by the spring elements 51, 51 as the cover 3 is pivotally moved, the lubricating oil such as grease received in the space S between the shaft portions 63, 63 is gradually supplied to between the shaft portion 63 and the spring element 51. Accordingly, an occurrence of oil shortage can be prevented for a long period of time. Thus, the shaft portion 63 can positively be prevented from being worn out quickly.

Other embodiments of the present invention will now be described. In the following description, like component parts of the first embodiment are denoted by like reference numerals and description thereof is omitted. Only the construction and operation different from the above embodiment are described.

Figure 14A:
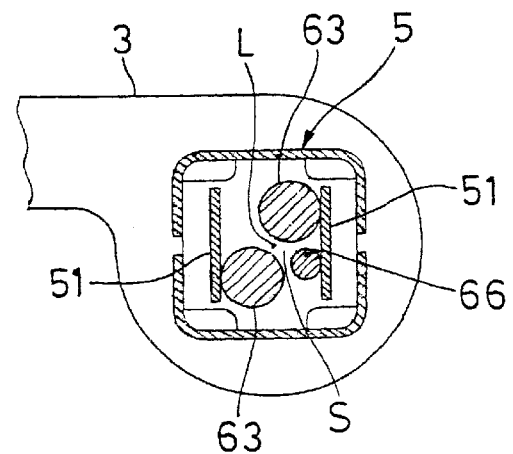
FIGS. 14(A), 14(B) and 14(C) are views similar to FIGS. 13(A), 13(B) and 13(C), respectively.
Figure 14B:
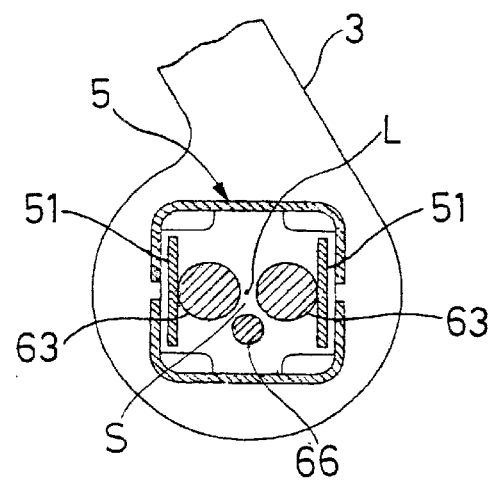
Figure 14C:
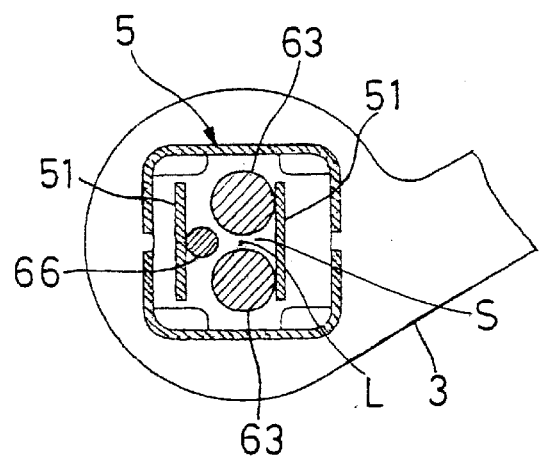

In the embodiment of FIG. 14, in addition to the shaft portions 63, 63, another shaft portion 66 is formed. This shaft portion 66 is arranged in such a manner as to be located at the vertex of an equilateral triangle which serves a line connecting the shaft portions 63, 63 as its bottom side. Moreover, as shown in FIG. 14(A), when the cover 3 is in the closed position, the shaft portion 66 is in contact with one of the two spring elements 51, 51 and pivotally biased by this spring element 51. Since the pivotal biasing force acting on the shaft portion 66 acts in a reverse direction to the pivotal biasing force of the spring elements 51, 51 with respect to the shaft portions 63, 63, the pivotal biasing force of the spring elements 51, 51 acting on the shaft portions 63, 63 is weakened by the pivotal biasing force acting on the shaft portion 66. Accordingly, when the cover 3 is pivoted from the open position side to the closed position by the biasing force of the spring elements 51, 51, the cover 3 can be prevented from hitting the telephone main body 2 at a high speed.

When the cover 3 is pivoted to the neutral position, as shown in FIG. 14(B), the operation is the same as in the above embodiment. When the cover 3 is pivoted to the open position, one of the two spring elements 51, 51 is contacted with the shaft portions 63, 63 and the other spring element 51 is contacted with the shaft portion 66. As a consequence, the interval between the spring elements 51, 51 when the cover 3 is pivoted to the open position can be larger than that of the above embodiment. Accordingly, the cover 3 can be maintained in the open position with a larger biasing force.

Figure 15A:
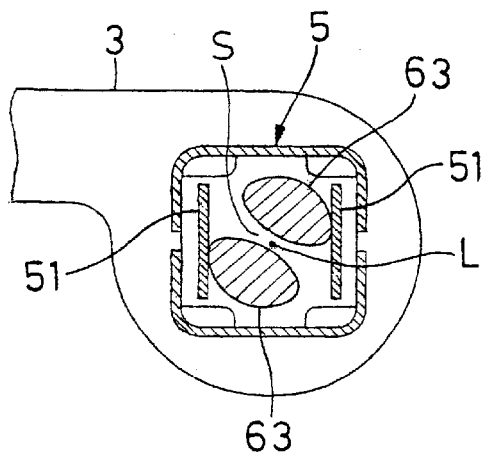
FIGS. 15(A), 15(B) and 15(C) are views similar to FIGS. 13(A), 13(B) and 13(C), respectively.
Figure 15B:
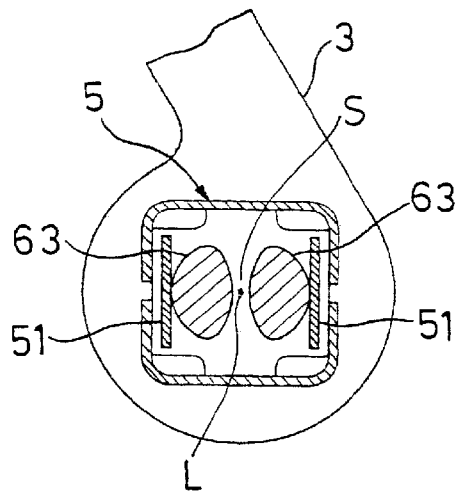
Figure 15C:
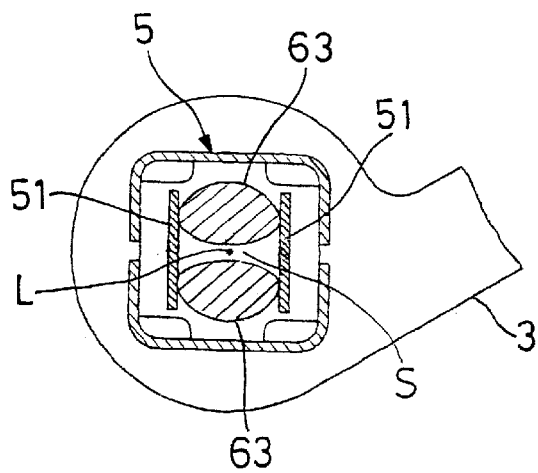

In the embodiment of FIG. 15, the shaft portions 63, 63 each exhibit an elliptical configuration in section. The outside diameter of each shaft portion 63 is small in a direction of a line connecting the shaft portions 63, 63 together and large in a direction orthogonal thereto. Accordingly, as shown in FIG. 15(C), the interval between the spring elements 51, 51 when the cover 3 is pivoted to the open position can be larger than that in the above embodiment. By this, the cover 3 can be maintained in the open position with a larger biasing force.

Figure 16A:
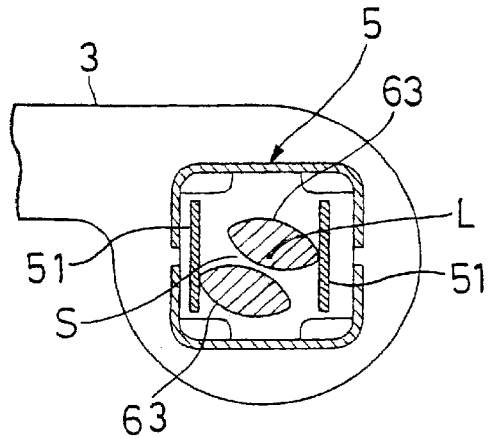
FIGS. 16(A), 16(B) and 16(C) are views similar to FIGS. 13(A), 13(B) and 13(C), respectively.
Figure 16B:
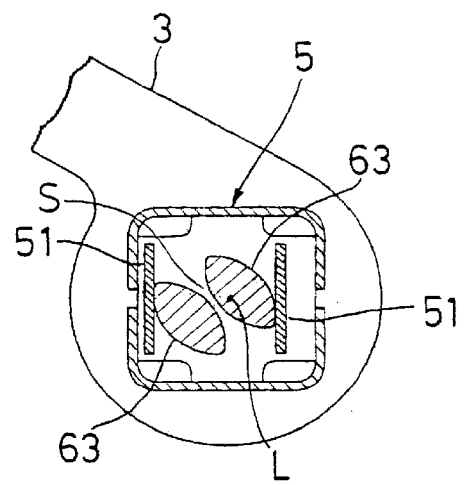
Figure 16C:
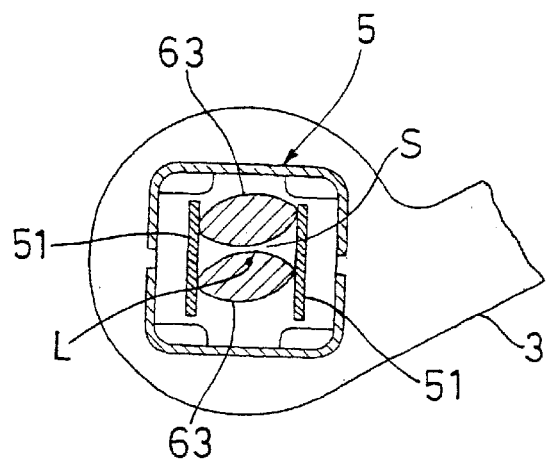

The embodiment of FIG. 16 is a modification of the embodiment of FIG. 15. That is to say, in the embodiment of FIG. 15, the shaft portions 63, 63 are arranged point-symmetrically with respect to the pivot axis L. In contrast, in the embodiment of FIG. 16, the shaft portions 63, 63 are arranged asymmetrically with respect to the pivot axis L. Moreover, one of the two shaft portions, 63, is arranged in such a manner as to include therein the pivot axis L.

In the embodiment of FIG. 17, the two shaft portions 63, 63 are designed in the form of a separate body from the other portion of the hinge shaft 6. However, the substrate portion 62 and the reinforcement plate portion 64 are integrally connected by a central shaft portion 67 extending on the pivot axis L. Owing to this arrangement, the hinge shaft 6 is entirely integrally formed. A space S is formed between the central shaft portion 67 and each shaft portion 63. Guide grooves (only the guide groove 64a formed in the reinforcement portion 64 is shown) are formed in opposing surfaces between the substrate portion 62 and the reinforcement plate portion 64. Those guide grooves extend a predetermined angle in the circumferential direction about the pivot axis L. Opposite end portions of each shaft portion 63 are movably engaged with the guide groove of the substrate portion 62 and the guide groove 64a of the reinforcement plate portion 64, respectively. If the substrate portion 62 and the reinforcement portion 64 are pivotably connected together through the central shaft portion 67, it is accepted that the shaft portions 63, 63 are formed integral with the substrate portion 62 and pivotable with respect to only the reinforcement plate portion 64. Of course, in that event, the guide groove 64a is formed in only the reinforcement plate portion 64.

In the hinge assembly of this embodiment, when the cover 3 is slightly pivoted from the neutral position, a large biasing force can immediately be acted on the cover 3. For example, in the case of the hinge assembly 4 of the first embodiment, when the cover 3 is pivoted to the nearby area of the central position, the two spring elements 51, 51 are brought greatly away from each other. As a consequence, their biasing force is increased. However, since the biasing force acts generally in a direction of the pivot axis L, the pivotal biasing force acting on the cover 3 is very small. Nevertheless, if the shaft portions 63, 63 are designed to be pivotable with respect to the substrate portion 62 and the reinforcement plate portion 64, presuming, for example, the cover 3 is pivoted from the closed position towards the open position side, only the shaft portions 63, 63 are caused to be pivoted from one end portion of the guide groove 64a to the other end portion by the spring elements 51, 51 when the pivotal member 3 moves beyond the neutral position. As a consequence, the interval between the spring elements 51, 51 is reduced but the acting direction of the biasing force of the spring elements 51, 51 is, even if slightly, offset from the pivot axis L. Accordingly, when the cover 3 is offset slightly from the neutral position, it can immediately be pivotally biased by the spring elements 51, 51 with a large biasing force.

Figure 18A:
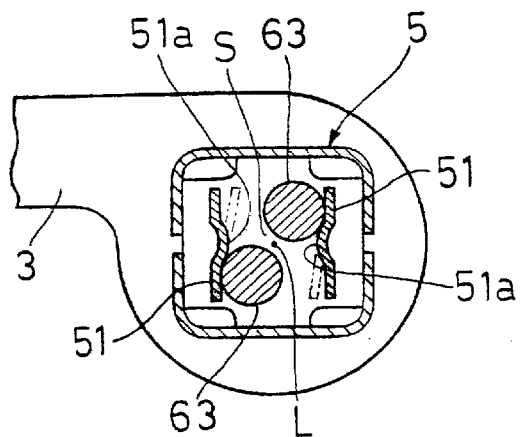
FIGS. 18(A), 18(B) and 18(C) are views similar to FIGS. 13(A), 13(B) and 13(C), respectively.
Figure 18B:
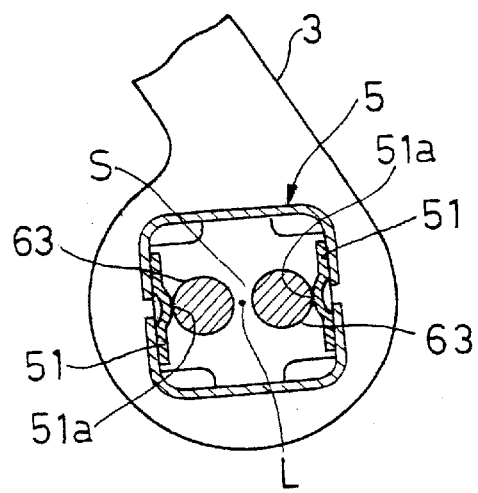
Figure 18C:
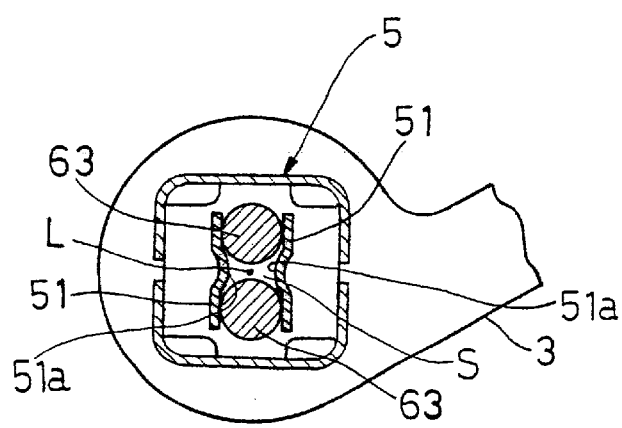

In the embodiment of FIG. 18, a protrusion 51a is formed on a widthwise central portion of each spring element 51. This protrusion 51a projects towards the shaft portion 63 side. This protrusion 51a extends in the longitudinal direction of the spring element 51. The protrusion 51a may project towards the reverse side of the shaft portion 63 side.

In the case where the protrusion 51a is formed on the spring element 51, the bend strength of the spring element 51 is enhanced. Therefore, when the shaft portion 63 is offset from the central portion of the spring element 51 and hits its one side portion as in FIG. 18(A), the spring element 51 is not twisted by its own resilient force as indicated by an imaginary line of FIG. 18(A) and its large biasing force with respect to the shaft portion 63 can be maintained. Accordingly, the cover 3 can be maintained in the closed position with a large force.

It should be noted that the present invention is not limited to the above embodiments and many changes and modifications can be made in accordance with necessity. For example, in any of the above embodiments, the hinge assembly of the present invention is applied to a cellular telephone. In the alternative, the hinge assembly of the present invention may likewise be applied to a toilet seat comprised of a main body (device main body) and a valve lid (cover).

Moreover, in the above embodiments, two spring elements 51 are employed. However, only one may be employed.

What is claimed is:

1. A hinge assembly having a device main body and an opening and closing member pivotably connected to said device main body, said hinge assembly comprising:

a hinge shaft disposed on a pivot axis of said opening and closing member, said hinge shaft being pivotably connected to selected one of said device main body and said opening and closing member and nonpivotably connected to the other; and a resilient member nonpivotably connected to the selected one of said device main body and said opening and closing member to which said hinge shaft is pivotably connected;

said hinge shaft being formed with a plurality of shaft portions extending generally parallel to said pivot axis, said shaft portions, which are in contact with said resilient member, restricting a pivoting position of said hinge shaft, said plurality of shaft portions being arranged away from one another so that a space is formed between the adjacent shaft portions.

2. A hinge assembly according to claim 1, wherein two of said shaft portions are provided.

3. A hinge assembly according to claim 2, wherein an outside diameter of said two shaft portions is small in a mutually opposing direction and large in a direction perpendicular thereto.

4. A hinge assembly according to claim 2, wherein said two shaft portions of said hinge shaft are connected to at least that portion of said hinge shaft which is connected to the other, (i.e., said device main body or said opening and closing member) such that said two shaft portions are pivotable within a predetermined range about the pivot axis.

5. A hinge assembly according to claim 2, wherein two of said resilient members are provided such that said two resilient members pinchingly hold said two shaft portions from opposite sides thereof.

6. A hinge assembly according to claim 1, wherein three of said shaft portions are provided, said three shaft portions being located at vertices of a triangle.

7. A hinge assembly according to claim 6, wherein two of said resilient members are provided such that said two resilient members pinchingly hold at least two shaft portions from the outside of said three shaft portions.

* * * * *